(12) United States Patent
Hsiung

(10) Patent No.: US 6,377,211 B1
(45) Date of Patent: Apr. 23, 2002

(54) APPARATUS AND METHOD FOR POINTING A DIRECTIONAL DEVICE FROM A MOVING VEHICLE TOWARD A SPACECRAFT

(75) Inventor: Chia Yi Hsiung, Dresher, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/735,682

(22) Filed: Dec. 13, 2000

(51) Int. Cl.[7] .............................. G01S 5/02; H04B 7/185
(52) U.S. Cl. ...................................................... 342/359
(58) Field of Search .......................... 342/359; 343/757; 701/220

(56) References Cited

U.S. PATENT DOCUMENTS 6,122,595 A * 9/2000 Varley et al. ............... 701/220

* cited by examiner

Primary Examiner—Theodore M. Blum
(74) Attorney, Agent, or Firm—W. H. Meise

(57) ABSTRACT

An antenna aiming or pointing apparatus and method is mounted on a vehicle, which may be moving or mobile, for pointing a directional antenna toward a spacecraft in a nongeosynchronous orbit. Since the vehicle moves, its attitude in terms of pitch, roll and azimuth or yaw change from time to time. As a consequence, neither the spacecraft nor the vehicle have a fixed location. The antenna pointing arrangement includes vehicle-mounted sensors for determining roll and pitch, and a compass for determining, with magnetic correction, the azimuth of the vehicle. In addition, the vehicle pointing system includes a GPS receiver, which produces signals indicative of the vehicle location and the current time. The system includes memory which is loaded from time to time with spacecraft orbital information as a function of time. The memory can be loaded from the internet by wireless Internet or by hard wire when the vehicle is stationary. A processor calculates the time-varying antenna pointing direction taking into account the vehicle attitude and azimuth. The antenna controller points a beam of the antenna toward the spacecraft based upon the pointing direction in vehicle-centric coordinates (190).

2 Claims, 4 Drawing Sheets

APPARATUS AND METHOD FOR POINTING A DIRECTIONAL DEVICE FROM A MOVING VEHICLE TOWARD A SPACECRAFT

FIELD OF THE INVENTION

This invention relates to the pointing of directional devices, such as antennas or antenna beams, toward a target, and more particularly to the pointing of antenna beams from a mobile platform toward a non-geostationary spacecraft.

BACKGROUND OF THE INVENTION

Modern communications systems often use one or more satellite relays to provide communications service to mobile stations. Geosynchronous or geostationary spacecraft are often used as the relays in order to provide communications to fixed locations on the Earth. However, geosynchronous-orbit spacecraft are for the most part located in nominally equatorial orbits at a distance of 22,400 miles from the Earth's surface. At this distance, the signals transmitted by the satellite for reception at the earth's surface tend to be relatively weak. At the fixed Earth location, however, a high gain antenna accurately pointed at the spacecraft may be used to compensate for the low signal level. Whether the spacecraft is geosynchronous or not, when the earth station is a mobile station such as a moving truck or aircraft, the antenna must be directed toward the target spacecraft in some manner. U.S. Pat. No. 6,016,120, issued Jan. 18, 2000 in the name of McNabb et al. describes a system for causing an antenna mounted on a mobile platform to point toward a selected target signal source. As described by McNabb, the system includes a GPS receiver associated with the vehicle, which provides information relating to the current position of the vehicle. The vehicle also includes an arrangement, such as a magnetic compass, for determining a cardinal direction such as North. Thus, the vehicle's location and orientation are (or can readily be) established. A processor associated with the McNabb system calculates the azimuth and elevation to the memorized target coordinates, and points the mobile antenna toward the distant target.

Some spacecraft-based communications systems use low- and medium- or mid-earth orbit spacecraft as relay stations in order to have the advantage of orbiting closer to the earth's surface than geosynchronous spacecraft, and so the signal levels available at the earth's surface from the spacecraft can be expected to be greater than in the case of geosynchronous spacecraft, assuming the same effective radiated power (ERP). Yet further, such low- or mid-earth orbit relay stations have lower propagation delay than geosynchronous relay stations. Thus, low or medium-earth orbiting relay stations can be advantageous. For such spacecraft relay stations, an omnidirectional antenna may be adequate for voice andor narrowband data communications relaying.

The transmission of large amounts of data requires broadband transmission capability, which in turn tend to require, among other things, high antenna gain, corresponding to large antenna aperture. High antenna gain is associated with narrow antenna beamwidths, which means that accurate pointing of the antenna beam toward the spacecraft is necessary. Since the spacecraft is in motion, the pointing must accommodate the motion, or tracking must be applied. Conventional large-aperture antenna techniques as applied to moving spacecraft usually involve beacon-signal or information-signal tracking loops to maintain the main lobe or antenna beam pointed toward the spacecraft. Spacecraft in geosynchronous, mid-earth and low-earth orbits move slowly enough so that ordinary tracking loops can maintain the antenna beam pointing toward the spacecraft. Such tracking loops, however, have insufficient bandwidth to accommodate the large and rapid variations in signal strength occasioned by a mobile platform such as a motor vehicle. Under such conditions, the tracking loop may break lock and spend significant amounts of time re-establishing lock, which results in mis-pointing of the antenna beam during the broken-lock and re-locking intervals. Mis-pointing of the antenna beam, in turn, results in loss of the broadband communication path for the unlocked interval. The unlock-relock cycle may be repeated many times per unit interval under adverse mobile platform environmental conditions, such as operating an aircraft in a storm or a wheeled vehicle on an unpaved road. The McNabb et al. system may not be effective in pointing a mobile antenna at a target spacecraft in the low- or mid-earth-orbit case, because, unlike the situation which McNabb et al. describe, the target location is not fixed. More specifically, the McNabb et al. system cannot provide antenna pointing when the target location is in motion.

Improved antenna pointing systems are desired.

SUMMARY OF THE INVENTION

An antenna pointing method according to an aspect of the invention is for pointing an antenna on a mobile platform toward a spacecraft for communications therewith. The mobile platform may be an automobile, boat, or aircraft. The apparent location of the spacecraft moves relative to a fixed location on the earth's surface, as may be the case for a spacecraft in other than a geosynchronous orbit. The pointing method comprises the step of storing data representative of the location of the spacecraft as a function of time, to thereby produce stored data. This stored data may be in the form of an equation defining the location of the spacecraft as a function of time, but might conceivably be in the form of random-access memory (RAM or a non-volatile memory such as ROM which is addressed by time to produce memorized locations, together with an interpolation step. The method also includes the step of determining a location of the mobile platform from GPS signals, and of determining the pitch (inclination), roll and yaw (azimuth direction) of the mobile platform relative to the horizontal and an ordinate direction (North, for example). The determination of the pitch, roll and yaw of the vehicle may be established by conventional sensors in conjunction with a magnetic sensor for determining North or other cardinal direction, with the aid of memorized magnetic declination (or magnetic variation) for the known location of the mobile platform. The current time is determined from the GPS signals, and the location of the spacecraft at the current time is determined from the stored data. The azimuth and elevation pointing angle or direction relative to the mobile platform are determined from the location of the mobile platform and of the spacecraft, and the pitch, roll and yaw of the mobile platform, together with, if necessary, any difference between the orientation of the mobile platform itself and the antenna mounting. Finally, the antenna beam is pointed in the azimuth and elevation angle so determined. The pointing of the antenna beam may be performed by actual slewing of the antenna mounting from the current position to the desired position, or if the antenna is of the electronically scanned type, the antenna beam may be slewed by control of the beamformer. The pointing technique according to the invention may be used to control the antenna pointing at the mobile platform, or a handoff to a tracking system may be made.

In a particular mode of the method according to the antenna, the spacecraft includes an antenna having a selected polarization, such as nominally linear vertical, or linear vertical and horizontal at different frequencies. The method further comprises the step of storing data representative of the polarization of the antenna on the spacecraft, to thereby produce spacecraft polarization information. This stored information may be in the form of a fixed direction reference to the spacecraft axes. From the spacecraft polarization information, the spacecraft and vehicle positions, and the current time, the apparent polarization of the antenna on the spacecraft is determined. The polarization of the antenna beam is set to nominally the apparent polarization of the antenna of the spacecraft. Control may be handed off to a polarization tracking system if desired.

DESCRIPTION OF THE INVENTION

Figure 1:
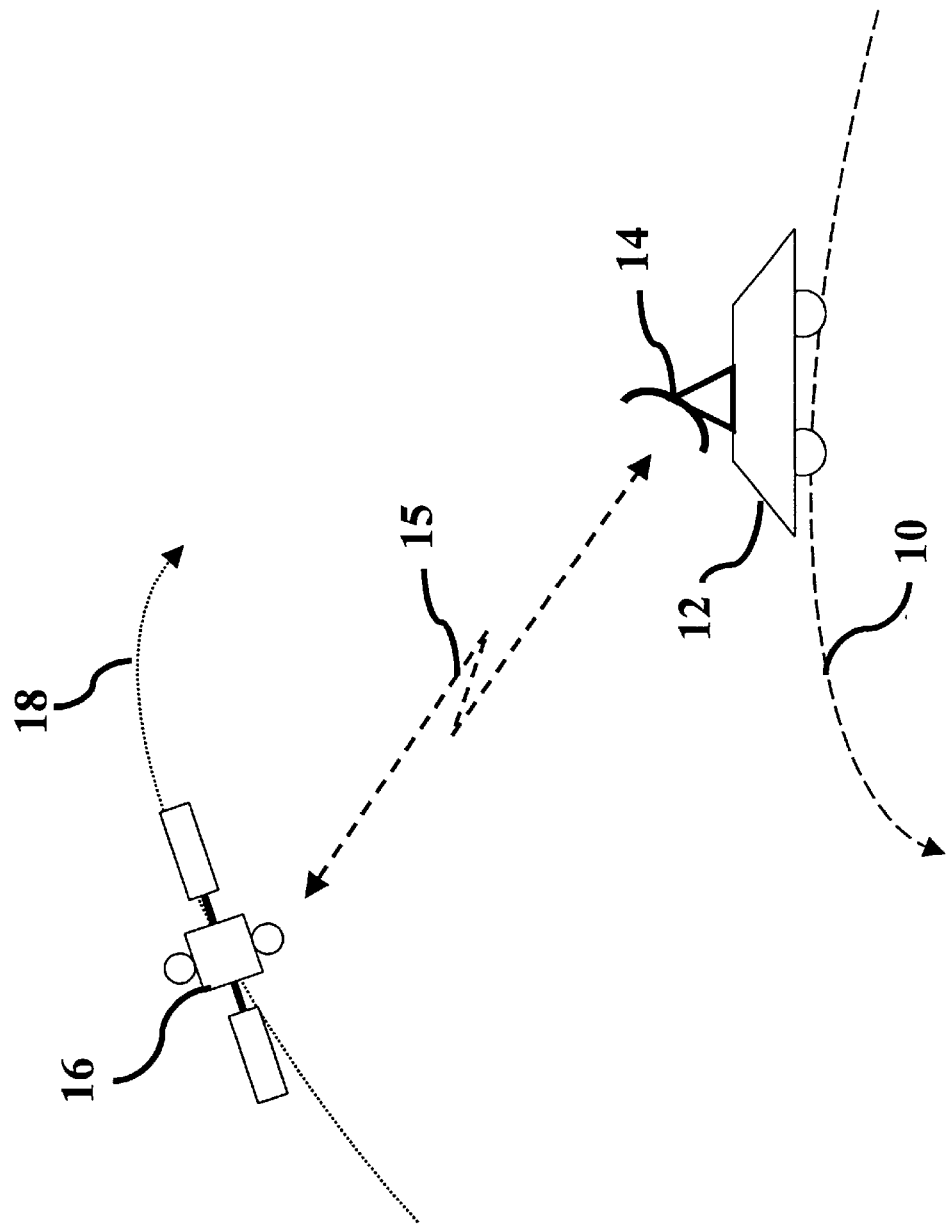
FIG. 1 is a simplified diagram illustrating a mobile platform in the form of a vehicle, and a spacecraft which moves relative to the Earth's surface.

FIG. 1 is a simplified representation of the Earth's surface 10. A mobile station 12, which may be stationary or moving, is supported by surface 10, and itself bears a directional antenna 14. Antenna 14 may be a parabolic-reflector type as illustrated, or it may be an array antenna, or some other kind of antenna. Those skilled in the art know that the directional beam(s) of array antennas may be directed in azimuth and elevation without actual motion of the antenna itself, and that some types of antennas, such as the abovementioned reflector type, require physical movement in order to direct the antenna beam(s) 15. FIG. 1 also illustrates a spacecraft 16 in an orbit represented by an arrow 18. The characteristics of orbit 18 are such that the apparent location of the spacecraft as seen from a fixed location on the Earth's surface changes as a function of time. Such an orbit may be, for example, a low-earth-orbit such as is used by Iridium or GlobalStar spacecraft, or it may be a medium-earth orbit, or it might be a Polar or super-high orbit higher than geosynchronous. In addition, a geosynchronous inclined orbit would result in spacecraft locations which change as a function of time, as seen from a fixed location on the Earth's surface.

The invention is based on the realization that in order to properly point an antenna toward a relatively-moving spacecraft from a relatively-moving vehicle, the time must be known, as well as the location of the spacecraft, and the location and orientation of the vehicle. The McNabb arrangement fails for lack of use of known time, and for lack of knowledge of the spacecraft's location at the known time.

Figure 2:
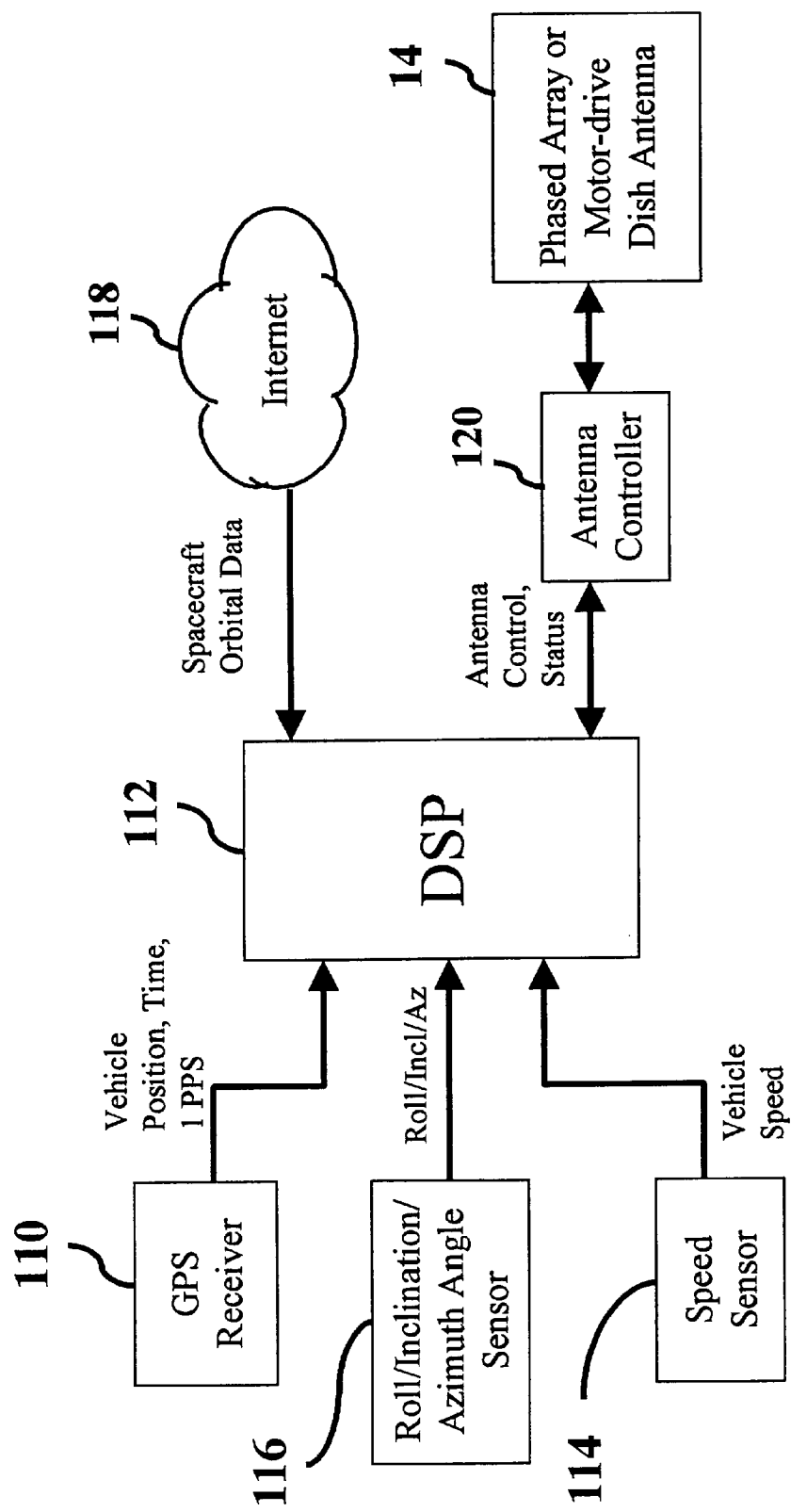
FIG. 2 is a simplified block diagram of an antenna pointing system controller according to an aspect of the invention.

In FIG. 2, a Global Positioning System (GPS) receiver 110 mounted on vehicle 12 receives signals from GPS satellites in known manner, and produces signals representing vehicle position, the current time (Coordinated Universal Time or UTC), and a one-pulse-per-second (1 PPS) timing pulse, all of which are applied to a processor (DSP) 112. The vehicle position information includes latitude, longitude, and altitude. A vehicle speed sensor 114 produces signals representing the speed of the vehicle, which are applied to DSP 112. DSP 112 also receives signals representing vehicle roll, inclination (pitch) and azimuth angle (yaw) from appropriate sensor(s) 116 mounted on the vehicle. One possible sensor is the Crossbow Model HDX-AHRS, manufactured by Crossbow Technology, Inc., whose address is 41 E. Daggett Drive, San Jose, Calif. 95134. This sensor senses roll, inclination, and azimuth angle, and includes a three-axis magnetometer to make a true measurement of magnetic heading. The azimuth information may be in the form of signals representing vehicle yaw relative to magnetic north; magnetic correction can then be performed in DSP 112 based on the location information from the GPS receiver 110 together with stored magnetic declination data. The GPS, orientation and speed sensors can provide DSP 112 with data at an update rate faster than once-per-second, thereby allowing the antenna pointing system to have near-real-time response.

The location of the spacecraft is determined from orbital information and the current time, where the current time is established by the GPS receiver signals. The orbital information is available on the Internet 118. The orbital information is ordinarily presented in the form of two-line mean Keplerian orbital elements (TLE). The United States Space Command tracks many space objects and provides the TLEs for public use, and updates the TLEs when a predetermined error is reached. The TLEs are readily available on the Internet at web sites such as NASA/Goddard Space Flight Center 104 (NASA/OGI http://oig1.gfsc.nas.gov/). Thus, the TLE data can be transferred from the Internet to the DSP memory (224 of FIG. 3) by hard wire during those intervals in which the vehicle is not in motion, or by wireless mobile Internet connections. The TLEs are valid until the next update is issued, which may be one day or a few days depending upon the orbital characteristics of the particular spacecraft being tracked. Updating of the TLE data in memory should be frequently enough to maintain current TLE information.

DSP 112 processes the sensor signals and the stored TLEs to produce antenna drive or control signals, which are applied to the beam control computer 120 of a phased-array antenna 14, or equivalently to the drive motor(s) of a dish-type antenna, so as to move or adjust the antenna beam or main lobe (15 of FIG. 1) relative to the vehicle 12 in such a manner that the beam or main lobe points at the position of the spacecraft (16 of FIG. 1).

DSP 112 of FIG. 2 performs the tasks of
  (a) receiving, storing and time-tagging measured data;
  (b) normalizing and correcting measured data;
  (c) calculating the position of the vehicle;
  (d) receiving and storing spacecraft orbital data;
  (e) calculating the spacecraft position;
  (f) calculating look angles and polarization angle based on the current time, vehicle position, and spacecraft position;
  (g) adjusting the pointing angles in response to vehicle roll, pitch, and yaw; and
  (h) outputting antenna pointing data to antenna controller 120.

Figure 3:
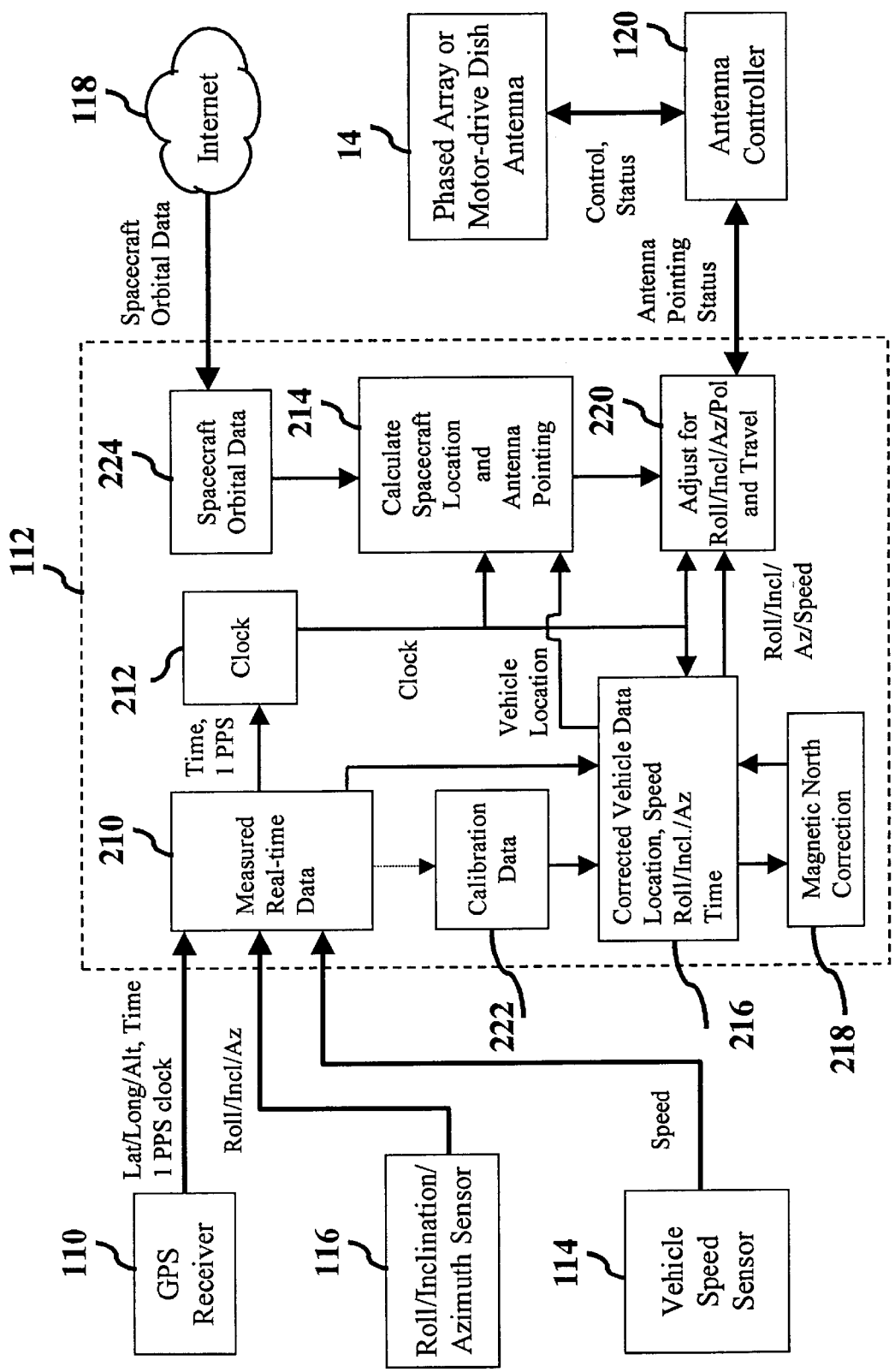
FIG. 3 is a simplified logic flow diagram or chart which illustrates the operation of the antenna pointing controller according to an aspect of the invention.

FIG. 3 is a conceptual block diagram of DSP 112 of FIG. 2 in its environment. Elements of FIG. 3 corresponding to those of FIG. 2 are designated by the same reference numerals. The structure of DSP 112 of FIG. 3 may be implemented as (a) a computer with appropriate input-output (I/O) coupling devices for communicating with the various external devices and sensors, or it may be implemented as (b) one or more specialized cards with one or a few ASIC chips which integrate all the memory, processing and communications functions, or as (c) anything between these extremes. It might even conceivably be implemented as a single solid-state chip. In FIG. 3, DSP 112 includes a register or database illustrated as a block 210, which provides a temporary storage for the currently measured or real-time data from GPS receiver 110, speed sensor 114, and orientation sensor 116. This data is time-tagged for later use. The current time and the 1 PPS clock signals are made available to a clock 212 for synchronization of the system timing therewith. The real-time data is also supplied to a corrected vehicle data generator or software subroutine 216, which, using the vehicle location information and a magnetic declination data memory 218, determines the applicable magnetic correction, and applies the correction to reference the vehicle azimuth to true North. In addition, the corrected vehicle data generator 216 applies any scale factors which may be required, depending upon the sensors, and corrects for any known sensor biases using stored calibration information 222. The corrected vehicle location information is made available to a calculation block illustrated as 214.

Memory 224 of FIG. 3 receives spacecraft orbit data from a data link, illustrated as an Internet cloud 118, and provides the spacecraft information to calculation unit or block 214. Memory 224 can be updated on a preset schedule, as for example at the beginning of a trip and every second day thereafter. Wired or wireless Internet connections may be used.

In addition to spacecraft orbital information, calculation block 214 also receives the current time from clock 212, and vehicle location from sensor 116. Calculation block 214 calculates the spacecraft location for the current time, its direction in azimuth and elevation relative to the vehicle, and generates the antenna pointing information. A substantial portion of the necessary information has already been calculated, as described above.

Standard software, such as shareware TRACKSTAR developed by Dr. T. S. Kelso, and available at http://celestrack.com, is capable of generating look angles (azimuth and elevation) toward a spacecraft from a fixed location at one or more specified times. This type of software can readily be adapted for mobile use, simply by repeating the calculation for each location of the vehicle, using location information which is corrected for vehicle orientation at that location.

More particularly, TRACKSTAR can be adapted to mobile vehicle use by, within calculation block 214, repeating the TRACKSTAR calculation for each vehicle position point. This adjustment is illustrated by the simplified pseudocode While "START" status=1 {
Read UTC (I) from 212
Read Position (I) from 216
Look_Angle (I)=TRACKSTAR [TLE, Position (I), UTC (I)].
Next I
}
Where UTC (I) and Position (I) correspond to the Ith data points for the UTC time and vehicle position, respectively. Note that the motion of the spacecraft is included in the TLEs and UTC time input. TRACKSTAR runs on a PC platform running Windows or DOS operating system. DSP 112 can include a Pentium-class PC board with sufficient speed to perform such calculations and to update the pointing command signals at a desired rate, such as once-per-second or more frequently, and thus in a real-time manner.

The result of the pointing direction calculation performed in DSP 112, referenced to the local horizontal plane and ordinate direction, is passed to block 220 of FIG. 3, in which the pointing direction is corrected for pitch, roll and yaw of the vehicle, and if necessary for the distance travelled due to the speed of the vehicle. The correction is easily performed if, in addition to azimuth and elevation adjustment, the antenna platform or controller provides two extra degrees of adjustment freedom, namely for roll and pitch. If this type of controller is used, the roll and pitch adjustment are simply the negative or opposite of the roll and pitch signals, respectively. In this situation, the azimuth setting is adjusted for the corrected value of vehicle heading or azimuth. Since all the data elements are time-tagged, each may be extrapolated to the calculation time or a common time closely related to the current time. The resulting antenna pointing angles or signals can be clocked to the antenna controller 120 either sequentially or synchronously to accommodate the inherent delay of the antenna pointing apparatus. The calculations can be performed on a fixed-periodic basis, or at intervals which vary depending upon the rate of change of the vehicle positions or attitudes as well as upon spacecraft movement.

The calibration information for calibration data memory 222 of FIG. 3 may be generated in any desired manner. One convenient method for calibration is to place the mobile station or vehicle at a known location, with a known orientation. The differences between the calculated location and orientation can be stored as fixed differences or biases which can be simply summed with the calculated values. As with any system, periodic recalibration is advisable.

The magnetic declination correction data within memory block 218 should be loaded with pertinent data, available from NOAA National Geophysical Data Center (NGDC, http://www.ngdc.noaa.gov/), prior to the start of a trip, and getting the latest updates by way of wired or wireless Internet during the trip. It would be preferable if memory block 218 were to be a combination of memory with processing so that interpolation of the correction value could be performed when the vehicle position falls between data points. As an alternative, DSP 112 could be programmed to perform this function.

Figure 4:
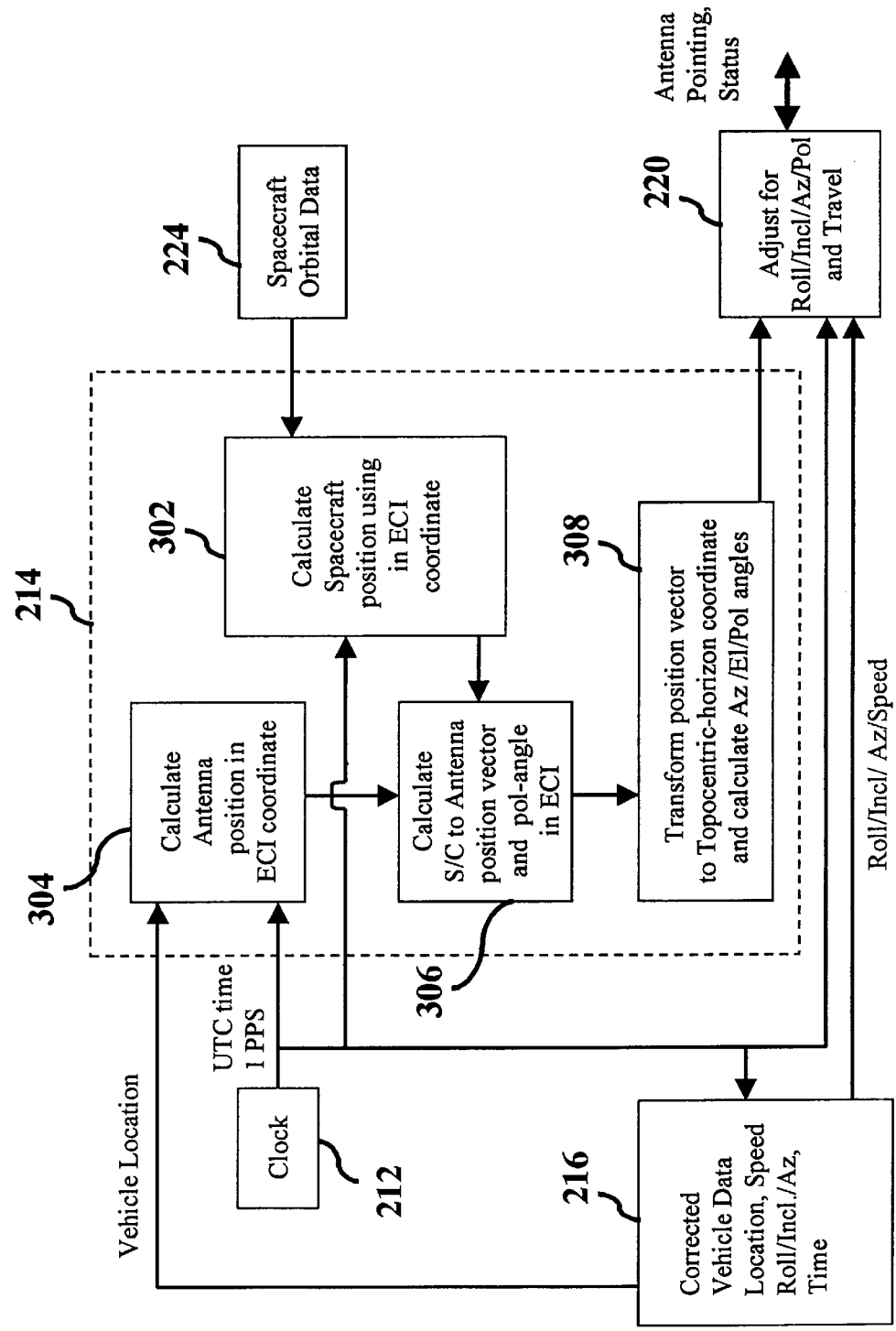
FIG. 4 is simplified logic flow diagram or chart which illustrates the operation of the antenna pointing controller of FIG. 3 at the mobile platform of FIG. 1.

FIG. 4 illustrates internal details of calculation block 214 of FIG. 3 in its environment. In FIG. 4, block 302 represents calculation of spacecraft position in Earth-Centered Inertial (ECI) coordinates. To perform this calculation, block 302 receives the TLE data from memory block 224 and the UTC from clock 212. The calculation of the spacecraft in ECI coordinates can be performed in any appropriate manner, as by using the North American Aerospace Defense Command (NORAD) Simplified General Perturbation (SGP4) model. Simultaneously, block 304 receives the UTC time from clock 212, together with the corrected vehicle location in terms of longitude, latitude and altitude or height above sea level, and calculates the vehicle (vehicle antenna) position in the ECI coordinates. With both the spacecraft and the vehicle antenna locations known in the same coordinate system, the spacecraft-to-vehicle position vector k and the apparent polarization angle are calculated in block 306. The polarization angle calculations cannot be derived solely from the TLE information, but requires additional information relating to the spacecraft itself, which is generally available from the spacecraft manufacturer. In the case of circularly or elliptically polarized spacecraft transmissions, polarization calculations may not be necessary. For linear polarizations, calculation of the polarization angle requires knowledge of the polarization vector e at the spacecraft. It can be shown that the apparent polarization angle ζ at the vehicle is $$\zeta = ABS\{arcsine[(p.f)/ABS(f)]\}$$

where

ABS{} is the absolute-value operator;

p is the polarization vector at the vehicle antenna, p=(g×k)/ABS{g×k};

f=k×r;

g=k×e; and r is the vehicle local gravity direction (plumb line), which is determined from the vehicle coordinates. In these equations and definitions, underlined values represent vectors and the symbols "×" and "." represent vector cross and dot product operations, respectively.

Finally, block 308 transforms the position vector to topocentric-horizon coordinates and generates the azimuth and elevation angles with reference to the vehicle (and local horizontal). The abovementioned look angle and polarization calculations, while tedious to perform by hand, are known and can be found in standard textbooks such as "Satellite Communications," by Dennis Roddy, 2nd edition, McGraw-Hill 1996. The TRACKSTAR shareware program can be used to perform the look angle calculations, and a simple computer program can be used to perform the abovementioned polarization calculations, or their equivalents.

Other embodiments of the invention will be apparent to those skilled in the art. For example, digital data may be processed in parallel or serial form. It is not necessary to account for apparent polarization when the spacecraft or the vehicle antenna is circularly polarized, as the response of such an antenna is nominally independent of rotational position about an imaginary line connecting the vehicle with the spacecraft. While the invention has been described in the context of an antenna, it could also be used for directing any directional device, such as a telescope or laser.

Thus, the invention relates to an antenna (14) pointing method for pointing an antenna (14) on a mobile platform (12) toward a spacecraft (16) for communications therewith, where the apparent location of the spacecraft (16) moves relative to a fixed location on the Earth's surface (10). The pointing method comprises the step of storing (224) data representative of the location of the spacecraft (16) as a function of time, to thereby produce stored data. The location of the mobile platform (12) or vehicle is determined from GPS (110) signals. The pitch, roll and yaw of the mobile platform (12) relative to the horizontal and an ordinate direction are determined (116). The current time (212) is established from the GPS (110) signals. The location of the spacecraft (16) at the current time is determined from the stored data and the current time. The azimuth and elevation pointing direction from an antenna (14) mounted on the mobile platform (12) to the spacecraft (16) are determined from the location of the spacecraft (16) and from the location, pitch, roll and azimuth of the mobile platform (12). An antenna (14) beam (15) is pointed from the mobile platform (12) in response to the azimuth and elevation pointing directions.

In a particular mode of the method according to an aspect of the invention, the spacecraft (16) includes an antenna (14) defining a polarization in which rotational position relative to a vehicle-to-spacecraft (16) line affects the antenna (14) response. The method further includes the step of storing data representative of the polarization of the antenna (14) on the spacecraft (16) as a function of time, to thereby produce spacecraft (16) polarization information. From the spacecraft (16) polarization information and the current time, the apparent polarization of the antenna (14) on the spacecraft (16) is determined. Finally, the polarization of the antenna (14) beam of the antenna (14) on the vehicle is set to about the apparent polarization.

What is claimed is:

1. An antenna pointing method for pointing an antenna on a mobile platform toward a spacecraft for communications therewith, the apparent location of which spacecraft moves relative to a fixed location on the earth's surface, said pointing method comprising the steps of:

storing data representative of the location of said spacecraft as a function of time to thereby produce stored data;

determining a location of said mobile platform from GPS signals;

determining the pitch, roll and yaw of said mobile platform relative to the horizontal and an ordinate direction;

determining the current time from said GPS signals;

from said stored data and said current time, determining the location of said spacecraft at said current time;

from said location of said spacecraft and said location, pitch, roll and yaw of said mobile platform, determining an azimuth and elevation pointing direction from said location of said mobile platform to said spacecraft; and pointing an antenna beam in said azimuth and elevation direction from said mobile platform.

2. A method according to claim 1, wherein said spacecraft includes an antenna defining a polarization, and further comprising the steps of:

storing data representative of the polarization of said antenna on said spacecraft as a function of time, to thereby produce spacecraft polarization information;

from said spacecraft polarization information and said current time, determining the apparent polarization of said antenna on said spacecraft; and setting the polarization of said antenna beam to about said apparent polarization.

* * * * *